United States Patent [19]

Bouricius et al.

[11] 4,302,810
[45] Nov. 24, 1981

[54] METHOD AND APPARATUS FOR SECURE MESSAGE TRANSMISSION FOR USE IN ELECTRONIC FUNDS TRANSFER SYSTEMS

[75] Inventors: Willard G. Bouricius; Paul E. Stuckert, both of Katonah, N.Y.

[73] Assignee: International Business Machines Corporation, Armonk, N.Y.

[21] Appl. No.: 108,071

[22] Filed: Dec. 28, 1979

[51] Int. Cl.³ .................. G06F 3/023; G06F 7/04; G06F 15/02; G06F 15/30
[52] U.S. Cl. .................................................. 364/200
[58] Field of Search .............................. 235/379–381; 340/149 A; 364/200 MS File, 900 MS File

[56] References Cited

U.S. PATENT DOCUMENTS

| | | | |
|---|---|---|---|
| 3,544,769 | 12/1970 | Hedin | 235/379 |
| 3,636,520 | 1/1972 | Berteau | 364/200 |
| 3,852,571 | 12/1974 | Hall et al. | 235/379 |
| 4,183,085 | 1/1980 | Roberts et al. | 364/200 |
| 4,198,619 | 4/1980 | Atalla | 235/381 |

Primary Examiner—Harvey E. Springborn
Attorney, Agent, or Firm—Roy R. Schlemmer, Jr.

[57] ABSTRACT

An electronic funds transfer system wherein it is required that a bank be reasonably guaranteed that the two parties to a retail transaction (i.e., a person and a retailer) agree on the transaction before the funds transfer takes place. The message including the transaction information is encrypted by the person using a unique encryption key ($K_P$) stored in a highly secure storage location in his own personal portable transaction device (XATR) and his data storage and transfer card (DSTC) and this first encrypted message is sent to the retailer who doubly encrypts the initially received encrypted message from P under his own unique encryption key ($K_R$) and this doubly encrypted message is sent to the bank. The person also sends the transaction message to the retailer in clear, and the retailer first verifies the message and then, utilizing his own encryption key ($K_R$), encrypts same and similarly sends it to the bank. The bank utilizing unique retailer and customer identification data sent with the message, accesses a "key" file and first extracts the retailer's key ($K_R$) and decrypts a first portion of the message, extracts the person's key ($K_P$) and decrypts a second portion of the received message. The bank then compares a predetermined portion of the transaction message originating with the person with a similar portion received from the retailer and if identical, the appropriate funds transfer is made. If the messages do not agree, a predetermined default procedure is initiated.

12 Claims, 7 Drawing Figures

FIG. 5A  STEP 1: MESSAGE RECEIVED AT HOST
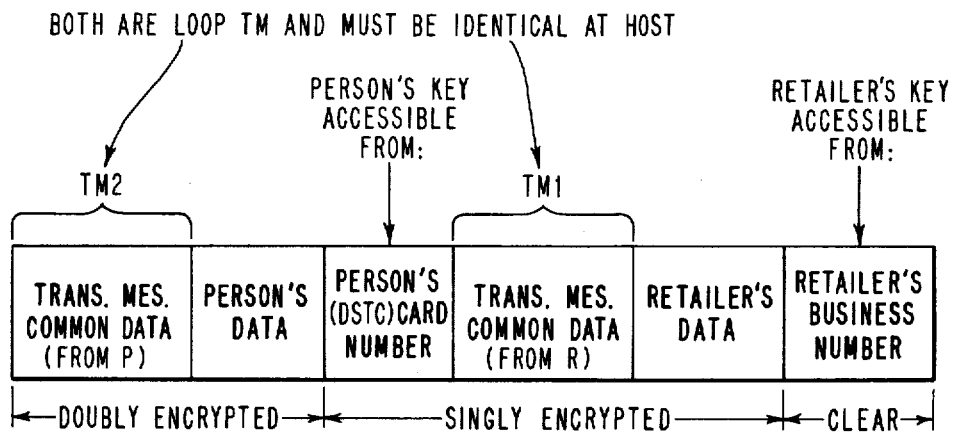
FIG. 5B  STEP 2: HOST OBTAINS $K_R$ USING RETAILER'S BUSINESS NUM. AND DECRYPTS TM1
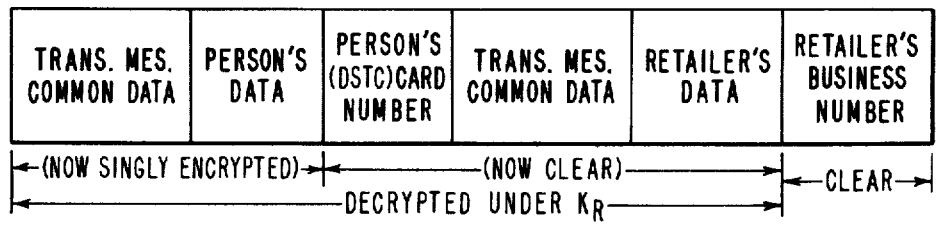
FIG. 5C  STEP 3: HOST OBTAINS $K_P$ USING PERSON'S CARD NUM. AND DECRYPTS TM2
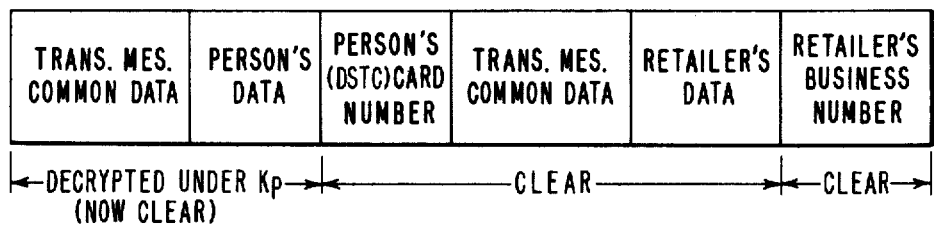

METHOD AND APPARATUS FOR SECURE MESSAGE TRANSMISSION FOR USE IN ELECTRONIC FUNDS TRANSFER SYSTEMS

DESCRIPTION

1. Technical Field

To a large extent modern business practices in many sectors of our economy have made unnecessary the physical handling of actual cash with its inherent dangers of theft and loss. Such sectors include banking, large retail stores, and a great variety of other businesses where articles are charged to an account, the purchaser billed, and the bills subsequently paid by checks. In such transactions the details are often recorded in computer data banks in which customer accounts are maintained and where the necessary debiting and crediting is done on a timely basis. The next logical extension to such automated electronic record keeping systems employing computers, credit cards and the like, is Electronic Funds Transfer Systems, specifically the direct transfer of funds from, for example, a Person's account to a Retailer's account upon the purchase of an item in a retail establishment. Such systems greatly reduce the paper work required of both the customers and the retail establishment.

In order for an Electronic Funds Transfer system to achieve wide public acceptance it must possess at least the following attributes. It must be possible for the Retailer (or other selling business entity) to adequately identify the Person seeking to make a purchase. Next, procedures must be established so that the Host system (typically a bank, a savings & loan institution, or a network of similar entities) which performs the funds transfer is certain that both the Person and the Retailer have agreed on the details of a particular purchase.

Further, the system procedures must be so structured that neither of the involved parties can repudiate the final funds transfer. Secure information transmissions must be provided between the Retailer and the Host system, whereby an eavesdropper on a communication link would not be able to obtain any information. Finally; sufficient information must be transmitted to the Host system to allow it to prepare periodic statements to be sent to the Person and the Retailer. Various other features or attributes may also be included in such a system as will be apparent from the subsequent description of the presently disclosed embodiment of the invention.

Thus, although the basic concepts of Electronic Funds Transfer systems are obvious, the lack of the above safeguards has to date prevented their wide commercial acceptance. However, the devising in recent years of secure and economical cryptographic methods for both communication and storage of (binary) data makes it's unauthorized decryption and use impossible as long as the encryption keys are not compromised. To establish a standard for government and industry use, the National Bureau of Standards has recently recommended a particular encryption algorithm. This recommendation is contained in the publication, "Data Encryption Standard," Federal Information Processing Standard (FIPS), Publication 46, National Bureau of Standards, U.S. Department of Commerce, January 1977. It describes a key-controlled block-cipher system. Such systems require the use of an encryption key consisting of a predetermined number of bits (e.g. 56) which key is employed for both the encryption and the decryption process and hence must be known to both the sender and receiver of enciphered transmissions. Any eavesdroppers will presumably not know the keys and will therefore not be able to decrypt the transmissions.

It is accordingly a primary object of the present invention to provide a secure message transmission system for use in an Electronic Funds Transfer system which communicates with a Host system. The system utilizes cryptographic techniques whereby any eavesdropper on the transmission line is unable to obtain any information which could later by used for fraudulent, illegal, or any other purposes.

It is another object of the invention to provide a message transmission system for use in the Electronic Funds Transfer environment whereby the two parties to a transaction may be assured that only the agreed upon transfer of funds will occur.

It is a still further object of the invention to provide such a method and apparatus utilizing state-of-the-art electronic hardware and cryptographic methods.

In summary, it has been found, that a secure message transmission system for use in Electronic Funds Transfer systems may be effected by utilizing currently available key-controlled block-cipher cryptographic methods in conjunction with electronic funds transfer cards and portable transaction terminal devices. Utilizing this system, the Host system which performs the electronic funds transfer may be assured that the Person presenting himself for a particular purchase and the Retailer both agree on the terms of the transaction. The Host is protected from the possibility of the Person and Retailer later disagreeing about some factual details of the transaction and one or the other seeking to repudiate the transaction. Further, all three parties to the system, may be certain that no one is capable of intercepting and decoding the messages. Further, the Person may be assured that the Retailer cannot gain access to his personal data and each party is protected against the other party reneging on a transaction or alleging that data was erroneously transmitted. These and other objects, features and advantages of the system will be apparent from the following description of the preferred embodiment of the invention.

2. Background Art

For a description of the operation of a typical block-cipher cryptographic system, reference is hereby made to U.S. Pat. No. 4,798,359 entitled, "Block-Cipher Cryptographic System", U.S. Pat. No. 3,796,830, entitled, "Recirculating Block-Cipher Cryptographic System"; and U.S. Pat. No. 3,958,081, entitled, "Block-Cipher System for Data Security", all assigned to the same assignee as the present application. These patents generally describe the concepts involved with sophisticated, Key-Controlled Block-Cipher Cryptographic Systems currently known in the art. The later U.S. Pat. No. 3,958,081 relates to a specific implementation of such a Block-Cipher Cryptographic System and much more particularly, a Cryptographic System which conforms to the previously specified Federal Information Processing Standard currently in effect in the procurement regulations of the United States Government.

For a description of a personal portable transaction terminal device (XATR) suitable for use with the presently disclosed invention which interfaces with a retailer's point of sale terminal (POST) on the one hand and with the Person's data storage and transfer card (DSTC) on the other, reference is made to copending patent application Ser. No. 866,197 filed Dec. 30, 1977 of Paul E. Stuckert, entitled, "Personal Portable Terminal for Financial Transactions". Reference to this patent application will illustrate a device suitable for use in the present invention wherein the Person has his own keyboard for entering confidential data which he may not wish to pass to the Retailer. Also provided in the XATR device is a display on which data can be selectively displayed.

For a description of a data storage and transfer card (DSTC) suitable for use with the present secure message transmission system, and, further, specifically adapted for use with a personal portable terminal device (XATR), such as described above, reference is hereby made to copending patent application of Paul E. Stuckert filed Dec. 3, 1979, Ser. No. 099,797, entitled "Method and Apparatus for Achieving Secure Password Verification". In this patent application a DSTC is disclosed which together with a suitably designed XATR, can store a person's secret encryption key $K_P$ and further incorporates a complete key-controlled block-cipher encryption device therein for encrypting a message. There is further disclosed the use of the XATR for the private entry of data via its self-contained keyboard and the viewing of data on the self-contained display, wherein neither the content of the keyboard entered data nor the displayed data need pass into the Retailer's POST.

BRIEF DESCRIPTION OF THE DRAWINGS

FIG. 5A illustrates the data content of a complete message received at the Host.

FIG. 5B illustrates the same total message shown in FIG. 5A in a first phase of message processing performed by the Host. FIG. 5C is similar to FIG. 5B and illustrates a second phase of message processing performed by the Host.

DISCLOSURE OF INVENTION

Figure 1:
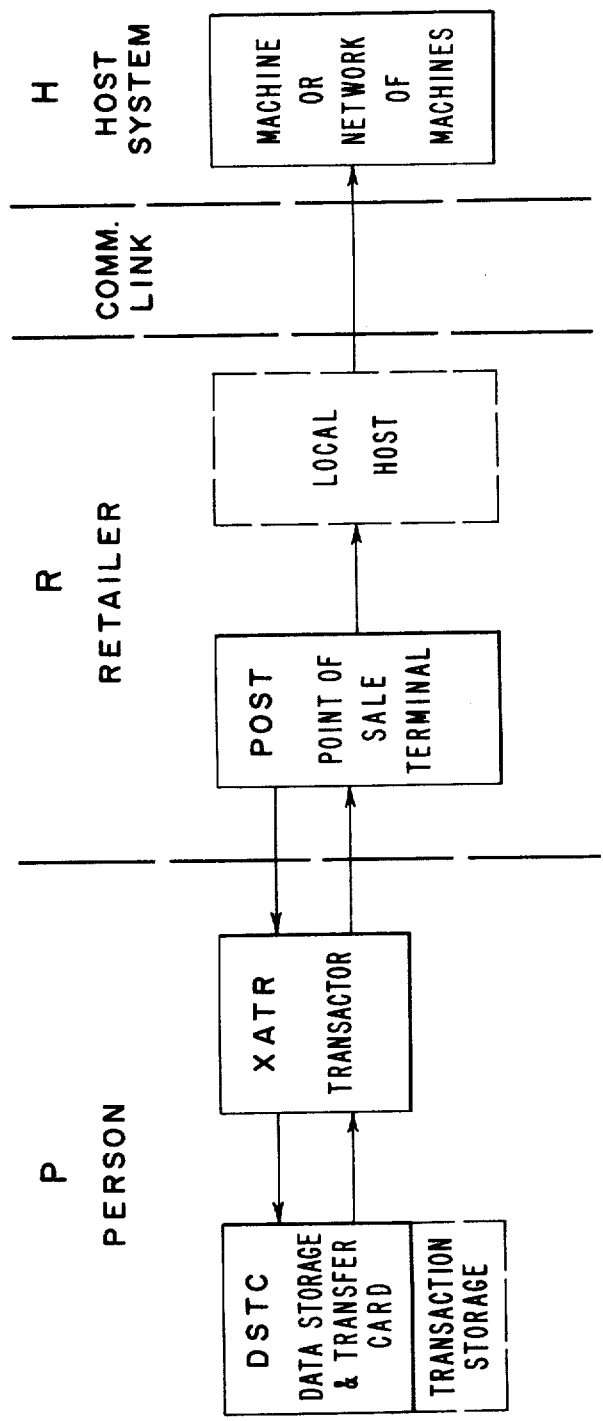
FIG. 1 is a high level block diagram of a secure message transmission system for use in Electronic Funds Transfer systems.

The present invention comprises a method and apparatus for effecting the secure transmission to a Host machine or system (H) of a transaction message (TM) which describes a financial transaction between a Person (P), and a Retailer (R) in an Electronic Funds Transfer (EFT) environment.

In its broadest aspect the invention comprises a method wherein P and R first agree on the contents of the TM which is to be sent to H where an EFT is to be effected. Next P sends the common data part of TM to R whose terminal can compare the two texts to assure detailed bit by bit agreement. Then P, employing encryption key $K_P$ encrypts both the common part of TM and other auxiliary information termed Person's Data and communicates them to R. R also receives unencrypted, Person's card number. To all this R catenates his own version of the common data and information termed Retailer's Data. R, employing encryption key $K_R$, encrypts all of these pieces to form the encrypted portion of TM that is sent to H. As FIG. 5A illustrates, part of the received message is doubly encrypted, part is singly encrypted, and part is in the clear. H can decrypt everything and compare the common data. Only if the comparison is exact does H transfer funds.

As will be understood, once anything is encrypted under P's key, the contents cannot be altered by R prior to transmittal to H. Without knowledge of P's key, R cannot either decrypt P's message or form a message which is acceptable to H. With the protection afforded by the system, R may store many TM's, involving many different customers, for subsequent batch transmission to H without any compromise to the security of the individual customers.

Any key-controlled block-cipher cryptographic communication system assumes the absolute security of the individual encipherment keys. There is no way to derive the keys, even knowing a plethora of clear texts and their paired encryptions. An eavesdropper would have to obtain both keys from P, R, or H by some method in order to initiate a fraudulent EFT by H.

Having thus described the salient features of the present invention there will now follow a description of further details of the data communication protocol of the present system and subsequently a description of the presently disclosed preferred embodiment.

In order for the overall operating characteristics of the present message transmission system to be understood, it is first necessary to understand the format and contents of an individual TM. The content of such a message for use with the present system is as follows:

(1) Each TM contains the date of the transaction and the time to the nearest second so that every TM will be unique even though it could be the same in all other respects. This prevents the multiple use of the same message.

(2) The specific amount of money involved in the transaction.

(3) A specification as to whose account (P's or R's) shall be debited and whose credited.

(4) A post date, if any, may be specified. In the course of the transaction P and R may, by mutual consent, agree agree on a post date, or it may be agreed upon in advance, e.g., the last day of any month.

(5) The unique number of P's Data Storage and Transfer Card (DSTC) must be specified. This information is necessary in order for the Host to obtain the encryption key $K_P$ from its own key storage files. The way this particular number is formatted in the TM and sent to H, and the way H utilizes the same will be set forth subsequently.

(6) The type of account (e.g., credit, charge, bank, debit, etc.) may be specified by P. This, of course, presumes that the system includes different account types. Normally, the account type designation would specify a particular H. Presumably, both the P and R would have accounts with a particular H in order for the fund transfer to be effected. Alternatively, Hosts with clearing house functions could be involved.

(7) The retailer R's business number.

It should be understood that P's DSTC number and R's business number may be utilized by H to determine account and equipment identification information. Alternatively, this information could be transmitted by P and R. This type of information might include types of accounts (mentioned above) and hardware identity information such as the type DSTC (assuming different models might exist), the type of XATR used by P, and the type of Point of Sale Terminal (POST), storage, and other equipment used by R.

Additional items could be included within a TM which would come under the heading of Person's Data and Retailer's Data as shown in FIGS. 5A through 5C. Items such as account balances, description of merchandise purchased, whether or not the item was on sale, and other pieces of information could be included. However, it is believed that such additional information should be properly tailored to the needs of the particular R and H and, as such, form no part of the present invention.

Referring now to FIG. 1, a high level block diagram of an EFT system as it would be configured for the presently disclosed secure message transmission system is shown. Three distinct entities are specified, the Person (P), the Retailer (R) and the Host system (H). Shown also is a communication link (COMM) link for interconnecting the retailer's point of sale terminal with the Host system. Vertical dashed lines represent interfaces between the entities, the most significant one being that between P and R. The R's POST is connected to P's XATR device by any suitable means such as described in the previously referenced copending application. Similarly, P's DSTC is shown in data transfer relationship with the XATR. For purposes of description P's DSTC and XATR may be considered as one functional unit wherein the XATR contains a keyboard and a display. The operation of the DSTC will be explained subsequently with respect to FIGS. 2 through 4. The minimum requirements of P's DSTC/XATR combination are a keyboard, a display, means for storing all or part of P's unique encryption key $K_P$, means for storing the unique number of the DSTC and encryption circuit means for performing the appropriate key-controlled block-cipher encryption of a given TM. Optionally the DSTC should have transaction storage for storing the TM for each transaction entered into by P, said storage being capable of being subsequently read out for P's personal use or to check any account statement received from H. Additionally, registers must be provided in both P's DSTC and R's POST for storing the elements of a given TM. R's POST must also have a keyboard and display for R's sales personnel to appropriately enter transaction data and should also include a clock for entering the aforementioned date and time of day into the TM.

The structure of H forms no part of the present invention and the various functions required of H may be readily performed by known programming techniques or dedicated hardware. These functions include: given P's card number and P's additional account information, H can by table look-up determine the specific number of any account designated by P and P's encryption key $K_P$. Similarly, given R's business number and various account identifying information H can by table look-up determine the number of the account designated by R and R's encryption key $K_R$.

With the two encryption keys $K_P$ and $K_R$, as will be explained subsequently, H can decrypt the singly and doubly encrypted portions of the TM received from R and, having done this, can compare certain portions of the received TM for identity.

H can also determine if two messages involving the same P and bearing the same date and time are received by H, in which event the redundant or stale second message is rejected.

Further, H is assumed to have the necessary accounting routines for debiting a specific account of P and crediting the specified account of R. Conversely, an account of P can be credited, and an account of R can be debited in the case of a "credit" transaction between P and R.

H is also assumed to have the ability to store properly authenticated TMs for funds transfer operations on a future data specified by a post date in the TM.

It should be noted that in FIG. 1 R is shown having a Local Host. A Local Host gathers TMs prepared by POSTs within a given retail establishment or group of establishments. These TMs would be temporarily stored and subsequently sent to the overall system Host in a batch. The disadvantage of this mode of operation is that a mistake or attempted fraud on the part of either P or R would not be detected until some time after the actual purchase.

Figure 2:
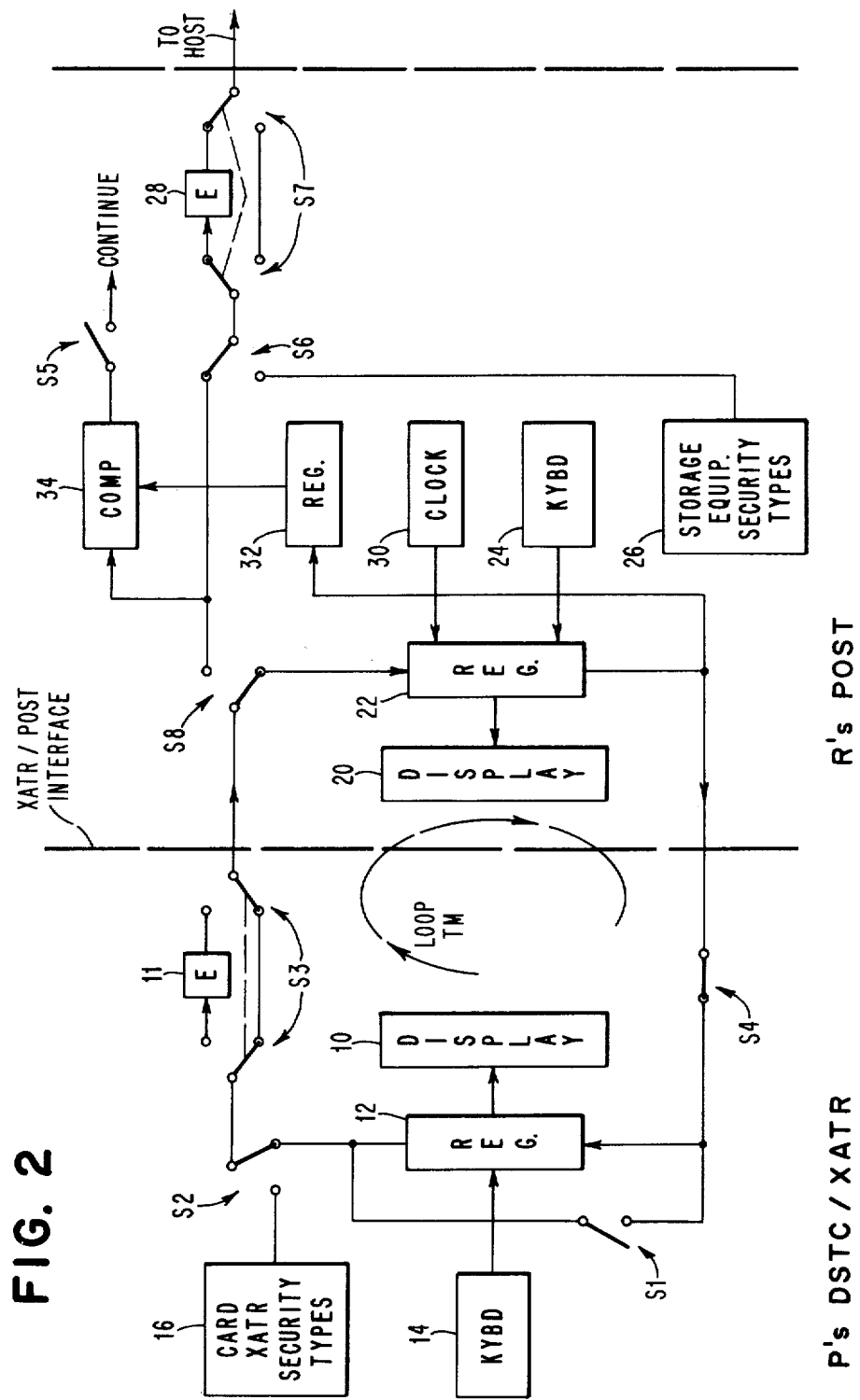
FIG. 2 is a detailed functional block diagram of a preferred embodiment of the present secure message transmission system illustrating the configuration of the system in a first mode of operation.
Figure 3:
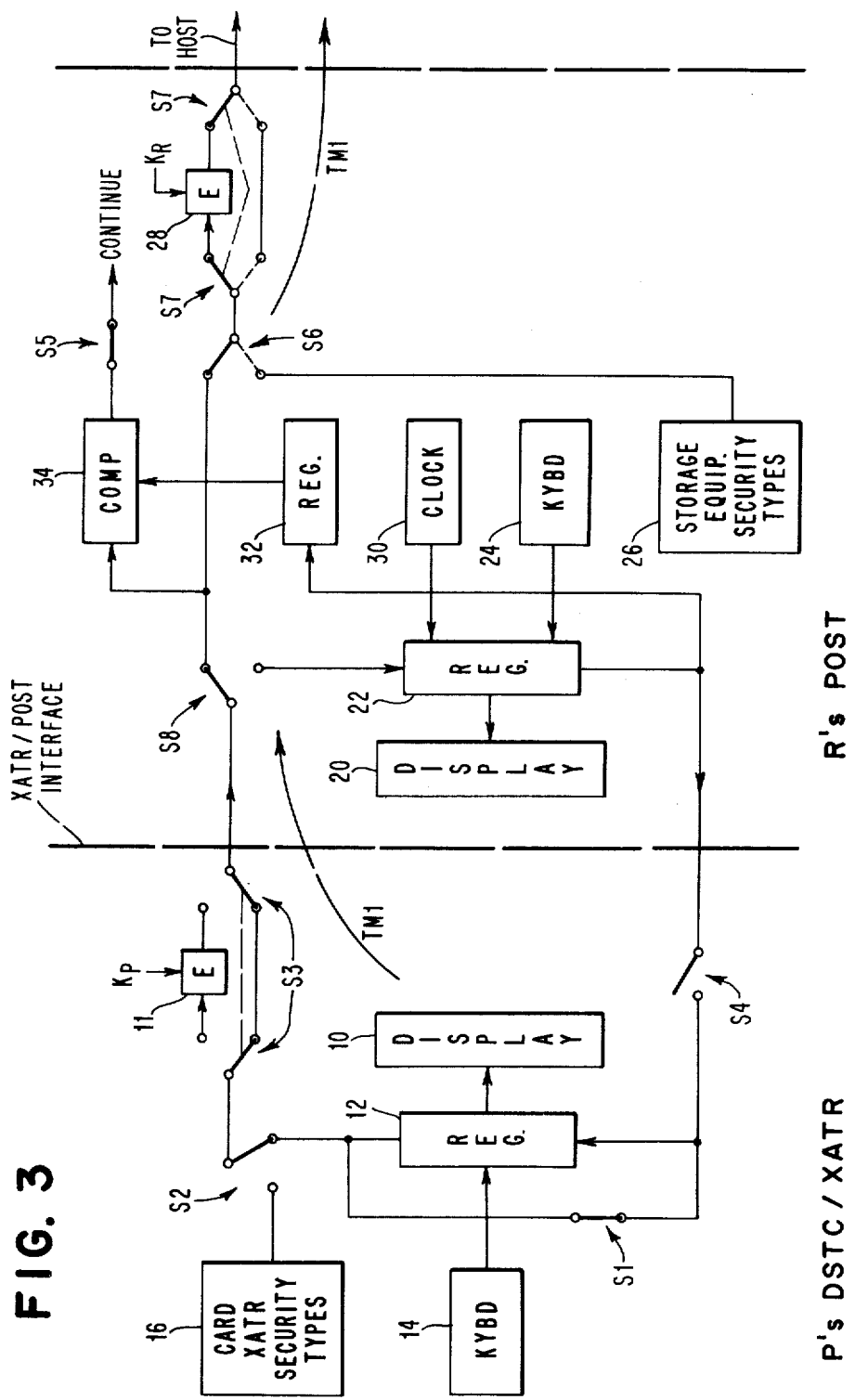
FIG. 3 is a detailed functional block diagram similar to FIG. 2 illustrating a second mode of operation.
Figure 4:
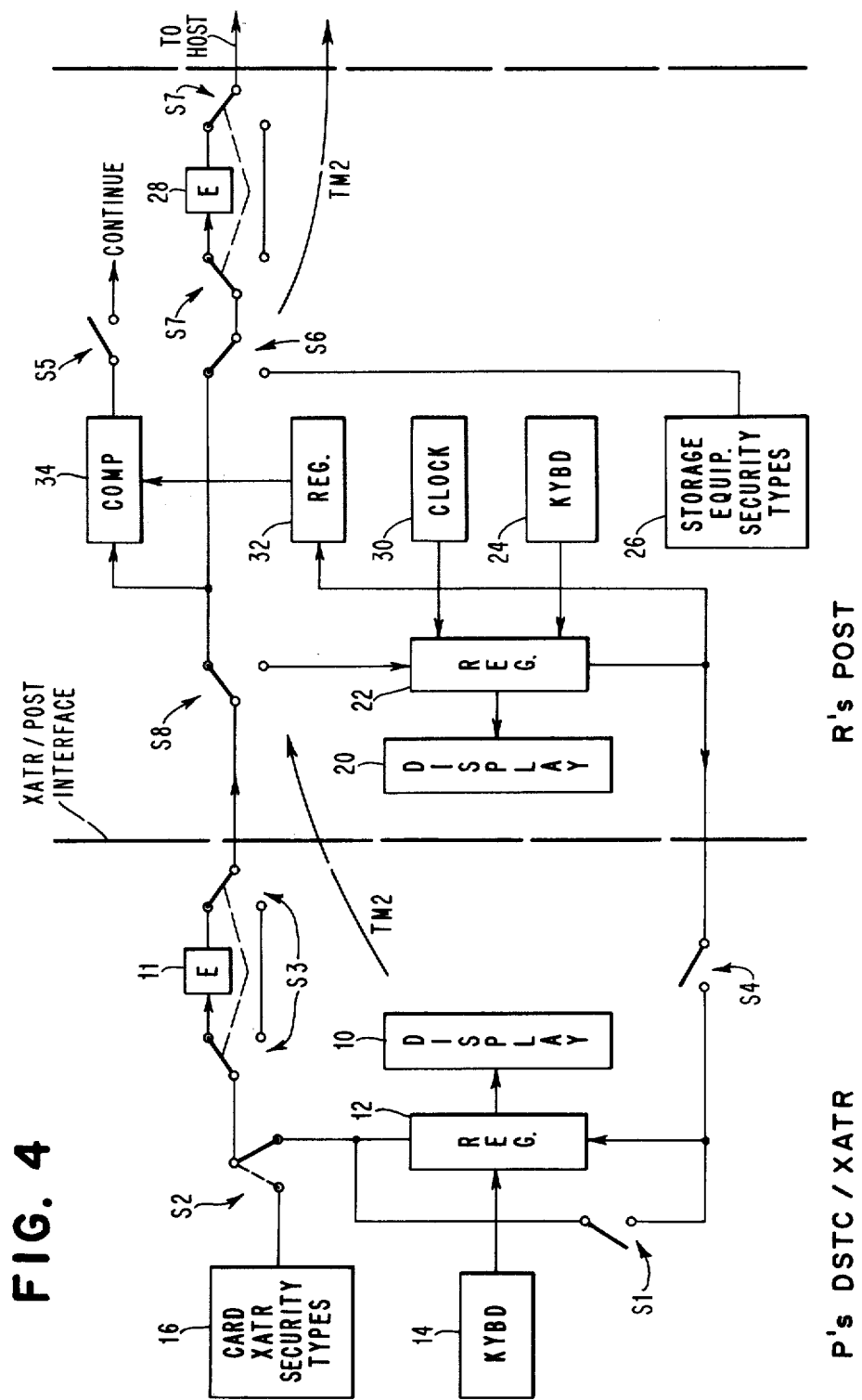
FIG. 4 is a detailed functional block diagram similar to FIGS. 2 and 3 illustrating a third mode of operation of the system.

Before proceeding with a detailed description of the preferred embodiment of the invention as set forth in FIGS. 2, 3 and 4, there will first follow a general description of the operation of the system as set forth in FIGS. 5A, 5B and 5C. Referring to FIG. 5A, the whole TM format is clearly shown insofar as the data content is concerned. This is the minimal data content which must be ultimately received from R by H, wherein said TM is a catenation of clear, singly encrypted, and doubly encrypted portions. From right to left in the figure, it will be noticed that R's business number is clear and it is with this portion of the message that H is able to obtain R's encryption key $K_R$, with which the remainder of the TM is decrypted. It will be noted that the singly encrypted portion of the message includes the person's DSTC card number, the transmission message common data (TM1) and an additional section denoted as retailer's data, which is comprised of various account pointers, equipment data, etc., unique to the retailer.

Similarly, the doubly encrypted portion of the original transmission message includes that portion of the transmission message encrypted by P's DSTC and XATR, and communicated to R. It will also be noted that a portion of the transmission message labeled as the person's data which, like the retailer's data, would further identify the account, the equipment types of both the DSTC and the XATR, and possibly additional financial data such as account balances, etc., may also be included in the TM but need not form a part of the common data. It is termed TM2.

P's DSTC number is transmitted to R in the clear and retransmitted to H in singly encrypted form so that the person's DSTC number may be employed by H after step 2. With this number P's encryption key $K_p$ may be obtained by H from its appropriate key file. FIG. 5B illustrates step 2 in the process. During this operation, as is apparent from the figure, the singly encrypted portion of the transmission message is decrypted and the items indicated as the P's DSTC card number, Transmission Message Common Data, and the Retailer's Data is now available to H in clear form. Similarly, the portion of the transmission message indicated as Transmission Message Common Data of P and the Person's Data is now only singly encrypted.

FIG. 5C illustrates step 3 at H, wherein it is assumed that H has obtained the Person's encryption key $K_p$ utilizing P's DSTC card number made available via step 2, and decrypts the now singly encrypted portion of the message using $K_p$. The result is shown in FIG. 5C, wherein all portions of the received TM are in clear form.

At this point, H examines the two portions of the TM common data and compares them for identity. If they are identical, the Host performs whatever operation or transaction has been specified. If there is a non-compare, both parties involved are notified so that they may initiate corrective measures.

Best Mode for Carrying out the Invention

Referring now to FIGS. 2, 3 and 4, the functional units and data flow are illustrated for the three different operating modes which occur during the formation of the composite transaction message which is ultimately sent from R to H. It will be noted that all three figures show identical hardware components, the difference being in the data flow in P's and R's equipment employed in the formation of the various portions of the message.

Assume that P and R have reached a purchase agreement relative to some item of merchandise. P connects his XATR, with his personal DSTC mounted therein, to R's point of sale terminal (POST). In the first mode of operation illustrated in FIG. 2, P's and R's equipment form a loop TM as a result of keyboard entries by P or R or by both. In this mode P's DSTC number is inserted into the message stream by P's XATR, and R's POST automatically inserts the date, time, R's business number, and R's account type. The amount, debit person, credit person, and post-date, if any, are shown on P's and R's displays.

By the keyboard 14 on his XATR, P specifies an account pointer, if desired, which would be placed into the personal data portion for P of the TM shown in FIGS. 5A through 5C.

Singly or jointly P and/or R, by appropriate entries on keyboards 14 and 24, cause the transaction data and the post date (if any) to be inserted in the loop TM. At this point, the Loop TM mode is complete and P and R both inspect their displays for concurrence.

If the displays define the transaction satisfactorily, P and R each depress "execute" buttons on their equipment, causing the following sequential actions to occur. P's XATR stores in register 12 located in P's DSTC, the data consisting of the date, time, amount, debit person, credit person, post date (if any), business number, and account type. R's POST stores the same data in register 22. This data so stored is the "common data" that must match, first for any transmission to H, and secondly within H to initiate a funds transfer.

It should be noted that by proper operation of Switch S6, R may add certain descriptive hardware data to TM1. This is indicated by the block entitled Retailer's Data in FIGS. 5A through 5C. Although, the Retailer's Business Number' is transmitted in clear form, it will be noted that this is part of the common transmission message data which will be utilized in the ultimate comparison at the Host. Similarly, referring to FIG. 5A, the block entitled 'Person's Card (DSTC) Number' is shown singly encrypted. This data also forms part of the common transmission message data of TM2 and is subsequently used in the comparison process.

Next the switches S1, S4, and S5 reconfigure the circuitry of the XATR and the POST. P then transmits his copy of all this common data to R and switch 8 routes it to a comparator for a bit by bit comparison and validation. If this data compares with that already stored in the POST, R encrypts it, together with other Retailer's data and sends it to the host along with R's business number in the clear, with switches as as shown by FIG. 4. Following this P singly encrypts, using his key $K_p$ the common data, together with any other desired Person's data, adds his XATR card number in the clear, and transmits all this to R. At R this data is further encrypted by R, employing key $K_R$, and transmitted to H. FIG. A shows the format of all this data as it is received by H. FIG. 1 summarizes the data components of TM.

TABLE 1

| TRANSACTION MESSAGE COMPONENTS | |
|---|---|
| 1. RETAILER'S BUSINESS NUMBER | |
| 2. PERSON'S CARD NUMBER | |
| | DATE |
| | TIME |
| | POST DATE (if any) |
| | AMOUNT |
| 3. LOOP TM | DEBIT PERSON (RETAILER) |
| | CREDIT PERSON (RETAILER) |
| | MERCHANDISE DESCRIPTION (optional) |
| | PERSON'S ACCOUNT TYPE (optional) |
| | RETAILER'S ACCOUNT TYPE (optional) |
| | ACCOUNT POINTER |
| 4. RETAILER'S DATA | TERMINAL MAKE AND MODEL |
| | TERMINAL STORAGE MAKE AND MODEL |
| | SECURITY INFORMATION |
| | ACCOUNT POINTER |
| 5. PERSON'S DATA | TRANSACTOR MAKE AND MODEL |
| | CARD MAKE AND MODEL |

As stated previously, as an alternative to R's sending the just completed transaction message to H he may either store it in local storage within his POST or within a local Host until a suitable number of transactions are accumulated. At this point, they may all be forwarded to H in a batch for processing. As stated previously, such option has the disadvantage of not allowing R to reconcile any discrepancies with P if subsequently such discrepancies are detected by H.

Upon completion of the transmission of the message to H, the transaction is completed insofar as P and R are concerned unless some sort of mismatch occurs and they are notified by H of some discrepancy. In such events R would initiate a retry or take some other corrective measure.

The operation of H described in detail in the Disclosure of the Invention section describes the operations performed by the Host in sequentially accessing the keys $K_R$ and $K_P$ for decrypting the received messages and making the required comparison of the common data prior to acceptance of the transaction.

It should be clearly understood that the herein disclosed system constitutes a Best Mode, however, many changes in form and detail could readily be made without departing from the essential features of the invention.

Also, as stated previously, some of the data stored in the registers 16 and 26 may be either deleted or expanded, depending upon the particular installation, and the fineness of control desired.

Additional transaction storage could also be provided in P's DSTC as mentioned previously (and illustrated in FIG. 1) so that the data for all transactions entered into by P would be stored. This data could then be printed or displayed at an appropriate terminal at a time chosen by P.

The disclosed embodiment of FIGS. 2 to 5 is essentially functional in nature. It will be appreciated that the actual control circuitry would consist of high speed electronic switches having appropriate microprocessor controllers for the actuation thereof. The provision of such hardware details would be obvious to those skilled in the art from the herein disclosed functional block diagrams and the detailed description of their operations.

Industrial Applicability

The present secure message transmission system has particular applicability to the retail sales and banking fields wherein point of sale terminals located in retail establishments are connected over low security public communication links to a central Host computer located, for example, in a bank where an electronic funds transfer operation is to take place.

The system renders practical the concept of electronic funds transfer utilizing currently available equipment. It allows the parties to such a funds transfer operation to have a high degree of confidence in the integrity of the system.

The use of the key-controlled block-cipher cryptographic systems currently available assures all three parties, P, R and H, that there is substantially no risk of the unauthorized interception and fraudulent use of any data contained in the transaction messages passing over public communication links. Furthermore, transmission errors are always detected because in such events the decryptions are garbled.

The Host, due to the protocol of the system is assured that if the common message data in the messages, TM1 and TM2, are the same, that he may proceed with the electronic funds transfer operation. He is further assured that neither of the parties P or R will be able to later repudiate the transaction, since it would be virtually impossible to forge either TM1 or TM2 without knowledge of the requisite encryption keys which would assumedly not be available to a fraudulent party.

R may have ultimate faith in the reliability of the system since the message TM1 is singly encrypted under his own key $K_R$ and that key is not available to P for any possible alteration.

Similarly, P is assured that there is no possibility of R's altering P's message TM2 which is transmitted to R in encrypted form since there is assumedly no way that R could have possession of P's encryption key $K_P$. This is because key $K_P$ never passes into the possession of R at any time.

While the system is believed to have primary applicability in the retail merchandise field as described hereinabove, it is submitted that certain of the underlying principles could be adapted to somewhat different business situations. For example, such a system could be installed in a stock brokerage office where it was desired to purchase stock via some sort of identification card such as a DSTC in the possession of the person. In this case, the retailer would be the stockbroker, who would communicate the transaction to a common banking institution where both P and the stockbroker had accounts. A further application might be in the banking industry where the retailer would be replaced by either a cash issuing terminal, or a remote teller location in a large bank system.

It will also be noted that the present system does not mention the additional security measures would in all probability be utilized in many installations, however, they would be add-on features to the system herein disclosed and do not directly relate to the present invention.

Having thus described our invention, what we claim as new, and desire to secure by Letters Patent is:

1. A method for effecting the secure transmission to a Host machine or system (H) of a transaction message (TM) which describes a financial transaction between a Person (P) and a Retailer (R) in an Electronic Funds Transfer (EFT) environment, said method comprising the Person (P) and the Retailer (R) agreeing on at least a predetermined portion of the contents of the transaction message (TM) which is to be sent to a Host (H) where the Electronic Funds Transfer is to be effected, separately encrypting the message (TM) under the two respective secret encryption keys $K_P$ and $K_R$ to form messages (TM, $K_P$) and (TM, $K_R$), communicating the message (TM, $K_P$) to R, R further encrypting same under the key $K_R$ to form a doubly encrypted message ((TM, $K_P$), $K_R$), transmitting the complete message [((TM, $K_P$), $K_R$,)+(TM, $K_R$)] to H, H accessing the two private keys $K_P$ and $K_R$ from its own secret files and decrypting the message received from R to recover the two originally encrypted transaction messages (TM), H then comparing portions of the two separately decrypted transaction messages (TM) for identity and if identical, completing the transaction.

2. A secure message transmission method as set forth in claim 1 including P and R separately constructing predetermined portions of said transaction original message (TM) prior to encryption and comparing said separately constructed portions for identity.

3. A secure message transmission method as set forth in claim 1 including R first constructing the predetermined portion of said transaction message (TM) and then commuting same to P, P displaying and examining same and if satisfactory encrypting the approved TM under his encryption key $K_P$, P then forwarding the so encrypted message (TM, $K_P$) to R, and R further encrypting same under his key $K_R$ and forwarding same to H.

4. A secure message transmission method as set forth in claim 3 including P transferring the message TM to R in the clear after approval of same, and R encrypting same under his key $K_R$ to form the message segment (TM, $K_R$) to form part of said transmission message being forwarded to H.

5. A secure message transmission method as set forth in claim 1 including R inserting a time value in the predetermined portion of said transmission message indicating the time of day and the date and H, upon receiving the transmission from R, checking the time of day and date to make certain it agrees with his own clock value within predetermined limits before approving said transaction message.

6. A method for the secure transmission of messages in Electronic Funds Transfer systems wherein it is required that a Host (H) be reasonably guaranteed that a Person (P) and a Retailer (R) agree on the transaction before the funds transfer takes place, said method comprising P encrypting first, his version, of a predetermined portion of a transaction message (TM) using a unique encryption key ($K_P$) stored in a secure storage location in his own Personal portable terminal equipment, to form an encrypted message (TM, $K_P$), P transferring said predetermined portion of the encrypted message to R's terminal, R who further encrypting the message received from P under his own key $K_R$ to form the doubly encrypted message $((TM, K_P), K_R)$ and transmitting same to H, R substantially concurrently also encrypting his version of the predetermined portion of said transaction message TM under his key $K_R$ to form the message $(TM, K_R)$ and transmitting same to H, H upon receipt of said two transmissions from R first accessing the two unique encryption keys of P and R, $K_P$ and $K_R$, H decrypting both said singly encrypted and doubly encrypted messages and comparing the two versions of the predetermined portions of the transaction message TM for identity and if equal, accepting the transaction for entry.

7. A secure message transmission method as set forth in claim 6 including R transmitting identification data for P to H in singly encrypted form under his key $K_R$ and his own identification data, and H utilizing this identification data to sequentially access the two keys $K_R$ and $K_P$ from a secure storage location.

8. A secure message transmission method as set forth in claim 7 including the step of R transmitting all of said messages to H encrypted under a transmission key $K_T$ in addition to the aforementioned encryptions and H upon receipt of messages from R first decrypting said messages under said transmission key $K_T$.

9. A secure message transmission method for use in an Electronic Funds Transfer system wherein a Host entity (H) must be assured that a Person (P) and a Retailer (R) agree on the details of an Electronic Funds Transfer (EFT) transaction that is to be performed by H, said method comprising, P and R agreeing on and cooperatively forming a common transaction message (TM) with a portable transaction terminal unit in the possession and under complete control of P and with a point of sale terminal under the control of R, said agreed transaction message including time and data information to be utilized in subsequent validation operations, both P and R storing their own respective copies of said agreed upon transaction message in their own terminal equipment, P encrypting said common transaction message (TM) under his Personal encryption key $K_P$ to form a singly encrypted message, $(TM, K_p)$ and transferring same to R, R further encrypting said received message under his key $K_R$ to form a doubly encrypted message $((TM, K_P), K_R))$ and transmitting same to the Host, as a first message segment, P next transmitting the common transaction message of TM to R in the clear, R comparing said common transaction message of TM to R with the previously agreed upon transaction message stored in his terminal and if there is agreement R encrypting the common message of TM under his key $K_R$ to form a second message segment $(TM, K_R)$ and R transmitting this message segment to H, R also sending to H together with said first and second message segments a third message segment containing P's identification data singly encrypted under R's key $K_R$ and R's identification number in the clear, H, upon receipt of said three message segments first accessing $K_R$ using R's identification number, and then decrypting the message segment containing P's identification number utilizing the accessed key $K_R$, accessing P's encryption key $K_P$ using P's identification number, decrypting the singly encrypted message $(TM, K_P)$ and the doubly encrypted message $((TM, K_P), K_R)$ using said two keys $K_R$ and $K_P$ respectively and comparing the two common transaction message portions of TM contained in said two message segments and, if equal, approving said transaction.

10. A secure message transmission apparatus for use in an electronic funds transfer system wherein it is required that a Host (H) be reasonably guaranteed that a Person (P) and a Retailer (R) agree on the transaction details before the funds transfer takes place, said apparatus comprising in combination:

a terminal under control of R including; a keyboard for entering transaction data by R, a display for visually observing and checking data entered, secure storage means for storing part of all of a unique encryption key $K_R$, a key-controlled block-cipher encryption unit operable under the key $K_R$ for encrypting transaction messages to be sent to H, clock means for inserting time and date data into the transaction message and means for transmitting R's identification number to H, a portable transaction terminal device uniquely under the control of P, adaptable for interfacing with R's terminal in a data exchange relationship, said device including; display means for displaying predetermined transaction message data to be sent to H, keyboard means for selectively entering data and commands into the device, storage means for storing account data unique to P, secure storage means for storing P's unique encryption key $K_P$, and a key-controlled block-cipher cryptographic unit identical to or compatible with that in R's terminal for encrypting transaction data under control of said stored key $K_P$, a Host computer (H's CPU) connected to R's terminal adapted to receive encrypted messages therefrom, H's CPU including a key-controlled block-cipher cryptographic unit identical to or compatible with those in R's terminal and P's portable terminal device for decrypting messages received from R, secure storage means for storing the unique encryption keys $K_X$'s of all Retailers (R) using the system and of all the Persons (P) using the system, means to access specific encryption keys from said secure storage means utilizing special identification data transmitted to H from R together with the transaction message, said combination further including control means in P's and R's terminals for entering common transaction message data and for displaying same on the display means in both terminals for approval by P and R and, if satisfactory, means in R's terminal for encrypting said common transaction data message under R's encryption key $K_R$ and sending same to H, control means in P's terminal device for first encrypting said common transaction data message under P's encryption $K_P$ to form a message $(TM, K_P)$ and transmitting same to R, and means in R's terminal for further encrypting the singly encrypted message from P to form a message $((T_M, K_P) K_R)$ and sending same to H, means in R's terminal for transmitting to H both P's and R's identification data, means in H's CPU for extracting the two keys, $K_P$ and $K_R$ from the secure storage means, utilizing the two identification data received from R, and first decrypting the two transaction messages received from R, encrypted under the key $K_R$ and next decrypting that portion of the transaction message which was additionally encrypted under the key $K_P$ and comparing the common portions of the transaction messages for identity, and if identical performing the requested transaction.

11. An electronic funds transfer system as set forth in claim 10 wherein the data and control lines between R's terminal and P's portable terminal device prevent P's unique encryption key $K_P$ from even being readable from P's terminal device and control means in P's device whereby only transaction data first approved by P may be encrypted by P's encryption unit.

12. An electronic funds transfer system as set forth in claim 11 wherein P's Personal portable terminal device includes a first unit, including a display means, a keyboard means for entering both data and commands, arithmetic and logic circuitry and required storage registers for performing predetermined arithmetic operations on data entered into said device, and a second unit physically associatable with said first unit in data exchange relationship therewith comprising a data storage and transfer card containing storage means for storing Personal data unique to P including account information, P's account identification number, and part or all of P's unique encryption key $K_P$.

* * * * *